United States Patent
Bull et al.

(10) Patent No.: US 7,878,734 B2
(45) Date of Patent: *Feb. 1, 2011

(54) HEAVE PLATE WITH IMPROVED CHARACTERISTICS

(75) Inventors: Diana Bull, Philadelphia, PA (US); James Gerber, St. Paul, MN (US); William Powers, Exton, PA (US)

(73) Assignee: Ocean Power Technologies, Inc., Pennington, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/796,851

(22) Filed: Apr. 30, 2007

(65) Prior Publication Data

US 2007/0286683 A1   Dec. 13, 2007

Related U.S. Application Data

(60) Provisional application No. 60/796,388, filed on May 1, 2006.

(51) Int. Cl.
*E02B 9/08* (2006.01)
*F03B 13/16* (2006.01)

(52) U.S. Cl. .............................. 405/76; 290/42; 290/53; 60/497

(58) Field of Classification Search .............. 405/195.1, 405/205, 76; 114/258; 60/495–497; 441/1; 290/42, 53
See application file for complete search history.

(56) References Cited

U.S. PATENT DOCUMENTS

| | | | | |
|---|---|---|---|---|
| 3,167,793 A * | 2/1965 | Keats | ............................ | 441/22 |
| 3,191,388 A * | 6/1965 | Ludwig | ........................ | 405/197 |
| 4,277,690 A * | 7/1981 | Noren | ............................ | 290/53 |
| 4,447,740 A * | 5/1984 | Heck | ............................... | 290/53 |
| 5,471,098 A * | 11/1995 | Asay | ............................... | 290/54 |
| 5,609,442 A * | 3/1997 | Horton | ........................ | 405/205 |
| 5,722,797 A * | 3/1998 | Horton, III | ................... | 405/224 |
| 5,842,838 A * | 12/1998 | Berg | ............................. | 417/331 |
| 6,102,625 A * | 8/2000 | Olsen et al. | ............... | 405/195.1 |
| 6,731,018 B1* | 5/2004 | Grinsted et al. | ................ | 290/42 |
| 6,772,592 B2* | 8/2004 | Gerber et al. | ................... | 60/495 |
| 6,831,374 B2* | 12/2004 | Seki | ............................... | 290/44 |
| 6,849,963 B2* | 2/2005 | Grinsted et al. | ................ | 290/42 |
| 6,933,623 B2* | 8/2005 | Carroll et al. | ................... | 290/42 |
| 7,033,115 B2* | 4/2006 | Huang et al. | ................. | 405/206 |
| 7,140,180 B2* | 11/2006 | Gerber et al. | ................... | 60/496 |
| 7,141,888 B2* | 11/2006 | Sabol et al. | ..................... | 290/53 |
| 7,199,481 B2* | 4/2007 | Hirsch | ........................... | 290/42 |
| 7,264,420 B2* | 9/2007 | Chang | ...................... | 405/195.1 |
| 7,323,790 B2* | 1/2008 | Taylor et al. | ................... | 290/42 |
| 2001/0000718 A1* | 5/2001 | Blevins et al. | ............... | 405/205 |
| 2003/0206772 A1* | 11/2003 | Horne et al. | ................... | 405/224 |
| 2004/0028479 A1* | 2/2004 | Horton, III | ............... | 405/223.1 |

(Continued)

*Primary Examiner*—Tara Mayo-Pinnock
(74) *Attorney, Agent, or Firm*—Henry I. Schanzer, Esq

(57) ABSTRACT

Apparatus embodying the invention include a damping plate attached to the submerged end of a spar-like element floating in a body of water. The spar like element tends to move up and down in a vertical direction in response to passing waves. The damping plate has a pair of oppositely facing surfaces extending transversely to the vertical direction of the movement of the spar-like element and vertical structures ("lips") mounted on the oppositely facing surfaces for increasing the effective mass of water pushed during movement of the damping plate through the water. Damping plates with lips, as per the invention, may be used in wave energy converters to control the relative motion between the spar-like element and a float to increase the energy produced.

4 Claims, 12 Drawing Sheets

U.S. PATENT DOCUMENTS

| | | | |
|---|---|---|---|
| 2004/0061338 A1* | 4/2004 | Woodbridge | 290/53 |
| 2004/0141812 A1* | 7/2004 | Busso | 405/203 |
| 2004/0163389 A1* | 8/2004 | Gerber et al. | 60/595 |
| 2004/0190999 A1* | 9/2004 | Wybro et al. | 405/203 |
| 2004/0208707 A1* | 10/2004 | Huang et al. | 405/206 |
| 2004/0253059 A1* | 12/2004 | Horton, III | 405/195.1 |
| 2004/0258484 A1* | 12/2004 | Haun | 405/210 |
| 2005/0099010 A1* | 5/2005 | Hirsch | 290/42 |
| 2005/0237775 A1* | 10/2005 | Sabol et al. | 363/178 |
| 2005/0281624 A1* | 12/2005 | Basak et al. | 405/224 |
| 2006/0120809 A1* | 6/2006 | Ingram et al. | 405/195.1 |
| 2006/0191461 A1* | 8/2006 | Chow | 114/264 |
| 2007/0046027 A1* | 3/2007 | Stewart et al. | 290/43 |
| 2007/0059105 A1* | 3/2007 | Chang | 405/195.1 |
| 2008/0014024 A1* | 1/2008 | Lokken et al. | 405/195.1 |
| 2008/0309088 A1* | 12/2008 | Agamloh et al. | 290/53 |

* cited by examiner

HEAVE PLATE WITH IMPROVED CHARACTERISTICS

This invention claims priority from provisional application Ser. No. 60/796,388 filed May 1, 2006 for Wave Energy Converter (WEC) with Heave Plates whose contents are incorporated herein by reference.

BACKGROUND OF THE INVENTION

This invention relates to plates (referred to herein as "heave" plates or "damping" plates) attached to the submerged end of a spar (or column), where the plates are shaped to increase the effective mass of the spar and to affect the phase relationship of vertical motion of the spar.

There are many applications where it is desirable to control the (up down) movement of an element placed in a body of water and subjected to the forces of the waves.

For example, in the case of wave energy converters (WECs), the system includes a buoy having a relatively flat float (hereinafter the "float") and an elongated float (hereinafter the "spar") which, when placed in a body of water, can move relative to each other in response to the motion of the waves. The WEC includes a power take off device (PTO) responsive to the relative motion between the spar and the float for producing suitable forms of energy, mechanical and/or electrical. In the case of the WEC, to improve the efficiency of power production, it is desired that the flat float move up and down generally in phase with the waves in the body of water in which the WEC is placed. However, it is desired that the spar move out of phase with respect to the waves and the float. This may be effectuated by attaching a heave (damping) plate to the submerged portion of the spar.

The heave plate is disposed in a plane which is generally transverse (perpendicular) to the up or down direction of motion of the spar for increasing the effective mass of the spar. A plate so attached affects the dynamic behavior of the spar by increasing the effective mass and the viscous drag in the heave (vertical) direction. In general, the benefit of attaching one, or more, heave plates is to allow for a shorter vertical spar that will still have a heave natural period outside of the prevailing wave period for the operating conditions (so that the spar will not respond to the prevailing wave conditions) and to increase the viscous damping of the spar in order to decrease near-resonance responses. The heave plates that have been employed in the past include thin square, circular, or rectangular plates that are either solid or have holes punched in them.

The added mass that the heave plates contribute is due to the fact that the acceleration or deceleration of the plate requires movement of some volume of fluid around the plate as it moves. The volume of fluid that the plate will move is proportional to the equivalent volume of the plate times some (experimentally determined) factor.

The equivalent volume of the plate depends upon the geometry of the plate, however the general rule is that the equivalent volume is the area of the plate multiplied by a linear dimension of the plate; e.g., the radius of a circular plate, the side length of a square plate; the width of a rectangular plate, etc. By way of example, the equivalent volume of a square plate of width and length d is a cube ($d^3$), that of a circular plate of radius r is a sphere ($4/3\pi r^3$), and that of a rectangular plate of length L and width d is a cuboid (3-D rectangle) by using the shorter dimension, d, as the $3^{rd}$ multiplier ($Ld^2$). In general heave plates are made thin to save on cost and weight; however a heave plate may be made to have an appreciable thickness to provide needed structural strength, or to use as a buoyancy chamber. If the heave plate is made thick, then the added mass may be modeled in a similar fashion to that described above. Also, although not discussed, the volume of fluid moved is also a function of the frequency with which the plate is moving.

The accelerated flow inertia force caused by the heave plate is the added mass of the system (the density of water times the equivalent volume times the experimental factor) times the acceleration of the system, or:

$$F_{Interial}=(C_m V_{equivalent}\rho)a=\text{AddedMass}*a, \quad \text{Equation 1}$$

where $C_m$ is the experimentally determined factor $V_{equivalent}$ is the equivalent volume defined above, p is the density of water, and a is the acceleration. Note that the added mass term, with units of mass, is the combination of the variable inside of the parenthesis.

In general, heave plates are placed between one length scale (d if a square or rectangle, r if a circle) below the surface of the water and one length scale above the ocean floor so that the full equivalent volume of fluid may be captured. For optimal heave plate operation, the heave plate is placed with as deep a draft as possible in order to reduce the effect of wave exciting forces.

It is advantageous to use heave plates to increase the effective mass (or hydrodynamic inertia) of a spar and to move the natural period of the spar outside of prevailing wave conditions. As shown in FIGS. 1A and 1B, the concept of using a heave plate to dampen the up down movement and to move heave natural resonance period outside of operational conditions is employed in association with offshore structures such as platforms 991 used in the offshore oil industry (like the truss spar or cell spar) as it yields a low cost/high benefit solution to the large dynamic range of the ocean. In the case of the oil platforms, a central spar (or column) is, or multi-columns are, fixedly attached to a platform to stabilize the platform and reduce its vertical motion. A heave (or damping) plate may be attached to the submerged portion of the spar to increase its effective hydrodynamic mass and introduce damping at near resonance events. The use of heave (or damping) plates enables the length of the spar to be reduced by creating a heave natural period that is outside of the prevailing wave periods in the operational climate.

The use of heave plates provides the advantages discussed above. However, in accordance with the prior art, the only known way to increase the effective mass of a spar via the use of heave (damping) plates (in order to increase the heave natural resonance period of the spar) is to increase the length scale (d, r, or L as mentioned above) of the heave plates (which is equivalent to increasing the surface area of the heave plates) or to increase the number of plates present. An increase in length scale can be hard to achieve when considerations of harbor depth, structural strength along the dimension of increase, and weight of the plate are taken into account. An increase in the number of plates requires the use of a longer supporting spar structure.

Thus, although the use of known heave plates presents significant advantages, it is desirable to further increase the effective mass of a spar-like structure without increasing the size of the spar and/or the length scale of the heave plate.

SUMMARY OF THE INVENTION

Applicants' invention resides, in part, in the recognition that a vertical extension ("lip") may be formed above and below and about the top and bottom surfaces of a heave plate attached to a spar to increase the effective mass of the spar to which the heave plate is attached.

Thus, in systems embodying the invention, a damping (or "heave") plate is attached to the submerged end of a spar like element floating in a body of water, where the spar tends to move up and down vertically. The damping plate, which extends generally in a horizontal plane, has a pair of oppositely facing surfaces extending transversely to the up and down motion of the spar. Vertically extending structures are mounted on the oppositely facing surfaces to increase the mass of water pushed during movement of the damping plate through the water.

When disposed in a body of water, the vertically extending structures, formed along the top and bottom surfaces of the damping ("heave") plate attached to a spar, cause an increase in the effective mass, or hydrodynamic inertia, of the damping (heave) plate. The increase in effective mass is a function of the volume enclosed by the surface area of the plate and the height of the vertical structures enclosing the damping plate.

In general, heave plates with attached vertical structures may be placed between one length scale plus the vertical extent (d if a square or rectangle, r if a circle, plus the height of the "lip") below the surface of the water and one length scale plus the vertical extent above the ocean floor so that the full equivalent volume of fluid may be captured. However, for optimal heave plate operation with attached vertical structures, the heave plate will generally be placed with as deep of a draft as possible in order to reduce the effect of wave exciting forces.

This invention can be applied to any system that has an oscillating component in heave (perpendicular to the sea floor) where it is desired to increase the hydrodynamic inertia of the system in order to cause a larger natural resonance period in heave.

The invention is applicable for use in wave energy converters (WECs) which include a float and a spar which, when placed in a body of water, can move relative to each other in response to the motion of the waves. The WEC may be of the type described and claimed in U.S. Pat. No. 7,140,180 assigned to the assignee of the present application and whose teachings are incorporated herein by reference. Although it should be understood that the invention is applicable to any apparatus having a spar to which a heave plate is attached to control the movement of the spar. This application also incorporates the teachings, as though fully set forth herein, of a patent application Ser. No. 11/796,852 titled Improved Wave Energy Converter (WEC) with Heave Plates being filed simultaneously with this application and assigned to the same assignee as this application.

The WECs include a power take off device (PTO) responsive to the relative motion between the spar and the float for producing suitable forms of energy, mechanical and/or electrical. The float is intended to move in phase with the waves and the spar is an elongated float which is intended to move out of phase relative to the waves and float. A heave plate with "lips" may be attached to the spar to increase the effective mass of the spar and increase the power conversion efficiency of the system.

This invention is also applicable, but not limited, to offshore platforms such as, for example, truss spar oil platforms, and cell spar oil platforms. In these applications, spar-like structures are used to stabilize very large floating off-shore oil platforms and to dampen their motion, particularly in the up and down direction.

Heave plates with vertical structures formed along the top and bottom surfaces of the heave plate may be attached to the spar-like structures to increase the effective mass of the spar-like structure without the need to increase the size of the spar and/or the length scale of the heave plate.

The heave plates may take any suitable shape (e.g., circular, elliptical, rectangular) best suited for the system in which it is being used.

The shape of the vertical structures formed on and around the damping plates may take many different forms, which include, but are not limited to: a cube structure, a straight thin structure, a cuboid structure (rectangular cross section), straight thin pieces arranged at an angle from the plate (so that there is a vertical extent), etc.

The vertical structures may be formed so as to be symmetrically disposed above and below the opposing surfaces of the damping plate. However, the vertical structures extending on one surface need not be the same as those on the opposite surface.

BRIEF DESCRIPTION OF THE DRAWINGS

In the accompanying drawings, which are generally not drawn to scale, like reference characters denote like components.

DETAILED DESCRIPTION OF THE DRAWINGS

Figure 5:
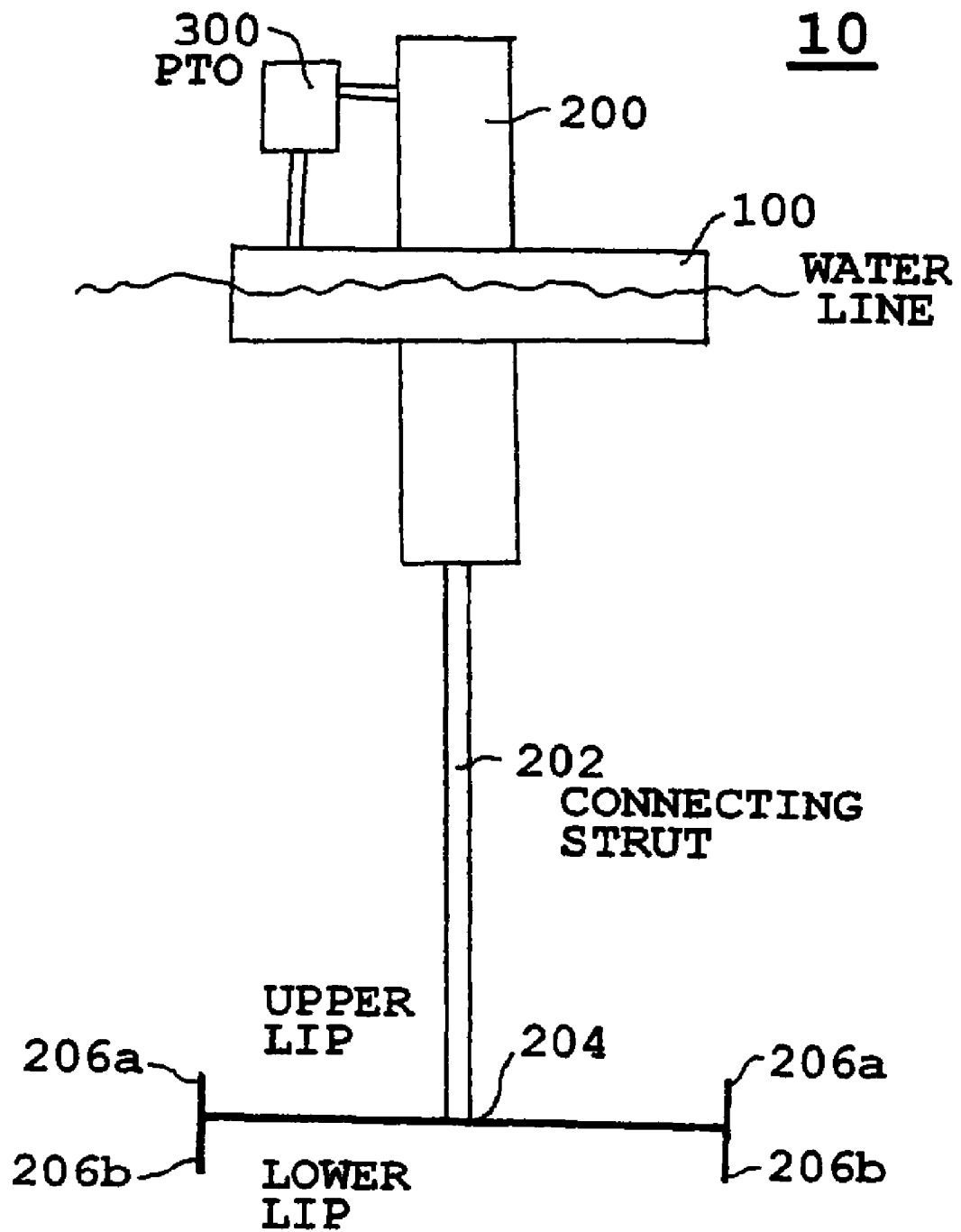
FIGS. 5 and 6 are cross-sectional idealized diagrams showing a heave plate embodying the invention connected to the spar and a power take off device (PTO) connected between the float and the spar.
Figure 6:
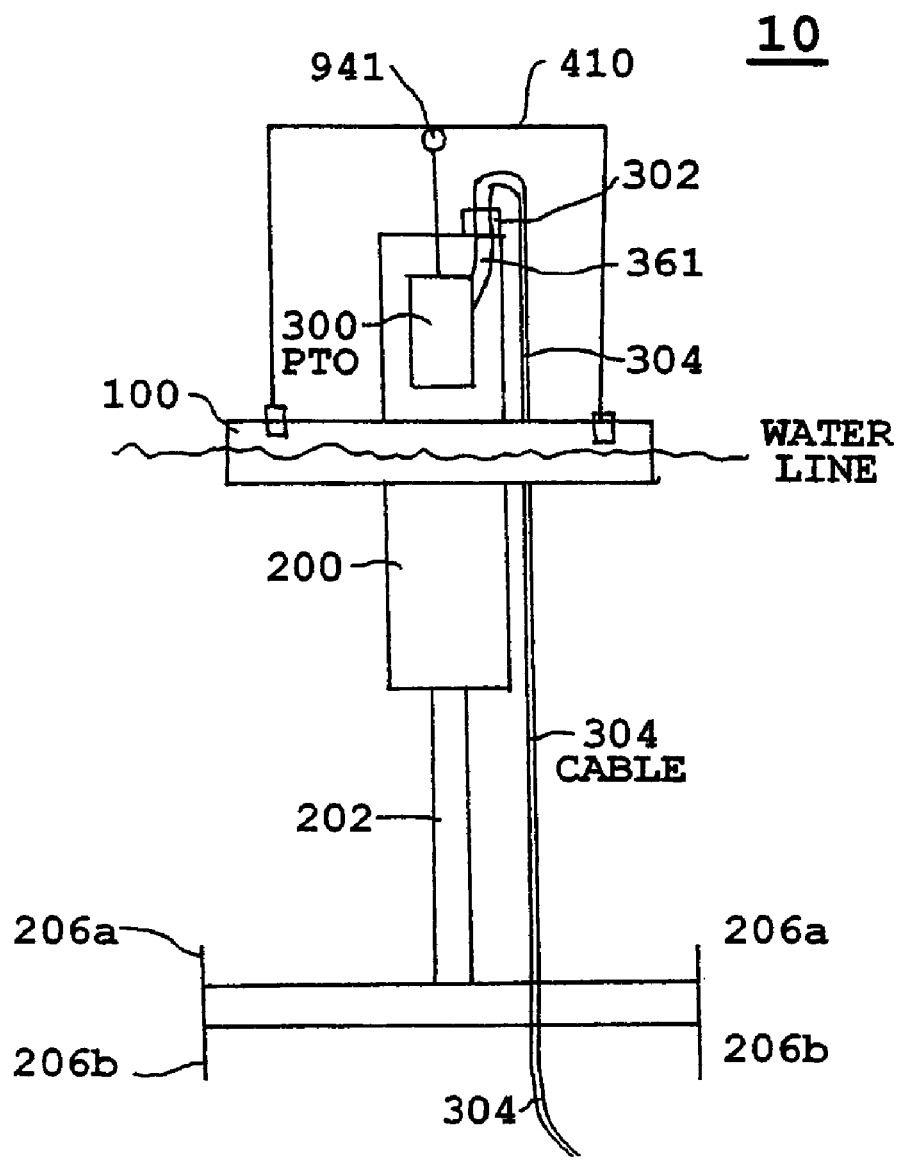
Figure 6:
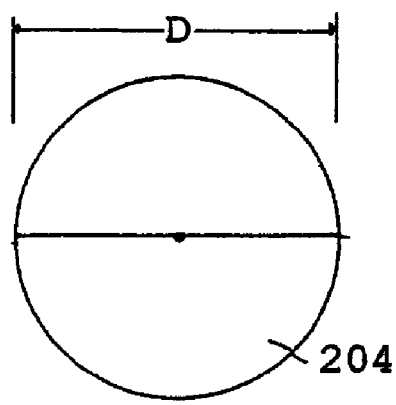

Referring to FIGS. 5 and 6, there is shown a WEC 10 having a neutrally buoyant spar 200, having a portion extending above the water line and another portion which is submerged. An annular float 100 with a central opening extends horizontally and is fitted onto and about the spar so as to move up and down along the spar in-phase with the waves. In FIGS. 5 and 6 the spar extends below the water line and the bottom portion of the spar is attached via a connecting strut 202 to a damping plate 204. For purpose of illustration only, it is assumed that the damping plate is circular, with a diameter "D"; and that the spar is attached (symmetrically) to the central region of the plate 204. In accordance with the invention, a vertical structure S1 (upper lip 206a) is attached to the top surface of the damping plate, along its edge, and extends for a height h/2 above the top surface of the damping plate. FIGS. 5 and 6 also show a vertical structure S2 (lower lip 206b) is attached to the bottom surface of the damping plate, along its edge, and extends for a distance h/2 below the bottom surface of the damping plate. In the discussion to follow and in the appended claims the vertical structures are also referred to as "lips".

For the example of FIG. 6, assume the plate to be a thin circular plate, of diameter D, and the vertical structures (lips) S1, S2, to have a total height of h (½ h above the top surface of the plate and ½ h below the bottom surface). The effect of the lips on the volume of fluid moved by the plate is expressed by the following equation:

$$V_{i,ippedPlate} = \frac{4}{3}\pi\left(\frac{D}{2}\right)^3 * \left(1 + \frac{3}{2}\frac{h}{D}\right) \quad \text{Equation 2}$$

where: D is the diameter of the plate and h is the total lip height. Equation 2 indicates that the entrained water volume for a circular plate with vertical structures S1, S2 is that of a sphere of water created by the movement of a plain plate (i.e. without vertical structures) plus that of a cylinder of water being formed by the area of the plate and the height of the vertical structures (lips). As noted in connection with equation 1, above, an experimentally determined factor multiplied by the above value along with the density of water provides an added mass value.

To move an equivalent volume of water when the lip height is zero (as in the prior art) the diameter of a circular plate would have to increase by $$\delta_{MinimumDiameterIncrease} = \left(1 + \frac{3}{2}\frac{h}{D}\right)^{1/3}, \quad \text{Equation 3}$$

in order to obtain the same added mass as the plate augmented with vertical members.

The height (e.g., h/2) of the vertical structures may be varied over a wide range. Some of the considerations that must be taken into account when determining the optimal lip height include (but are not limited to): (a) the interaction area of vertical members when oscillating surge or sway (objects in the ocean not only move up and down but are also subjected to a transverse force because the water particles in waves move in an elliptical fashion, thus yielding a forces in the "x" direction (surge) and the "y" direction (sway)), (b) interaction area of vertical members with current; that is, there may be sub-surface current(s) transverse to the lip height which would tend to push the structure in an undesired and/or uncontrolled manner, and (c) weight of system.

Thus, depending on the various factors, the ratio of the height of the vertical structures to the length scale of the heave plate, (h/D), may generally vary between 0.01 and 1.

In the example above the vertical members were assumed to be placed symmetrically above and below the plate resulting in like responses for up and down movement. However, the vertical structures (members) or the heave plate itself, may be designed to provide a different response when being lifted (raised) as compared to when it is being driven down (lowered). This may be achieved by making the vertical structures above the heave plate different than those formed below the heave plate. Alternatively, the heave plate may be shaped so that there is vertical extent preferential to one direction. For example, in a floating system that comes close to the sea floor in storm conditions, a longer vertical extent towards the sea floor is used so that as the floating body moves towards the sea floor the added mass and drag are greater hence helping to impede the motion.

FIGS. 2 through 8 depict WECs with at least one "heave" plate, having vertical structures extending therefrom, connected to a submerged portion of the spar, below the water line. The heave plate, as used herein, refers to a plate extending in a generally perpendicularly direction to the spar. In the figures the heave plate is shown to be circular. However, the plate could be triangular or a square or any polygon so long as the spar is centrally located about the surface of the plate. The spar need not be a single cylinder structure but may instead be a truss spar that will be attached to the heave plate. The heave plate will then be attached in a symmetrical manner to the spar.

As already noted the heave plate provides drag (resistance) and added mass characteristics (inertia) important in the operation of the WEC. Hence, while the float is designed to respond to the higher frequency motion of the waves, the heave plate gives the spar characteristics to respond to much lower frequency (longer period) wave motions and thus increases the differential in the relative motion between the spar and float.

Figure 2:
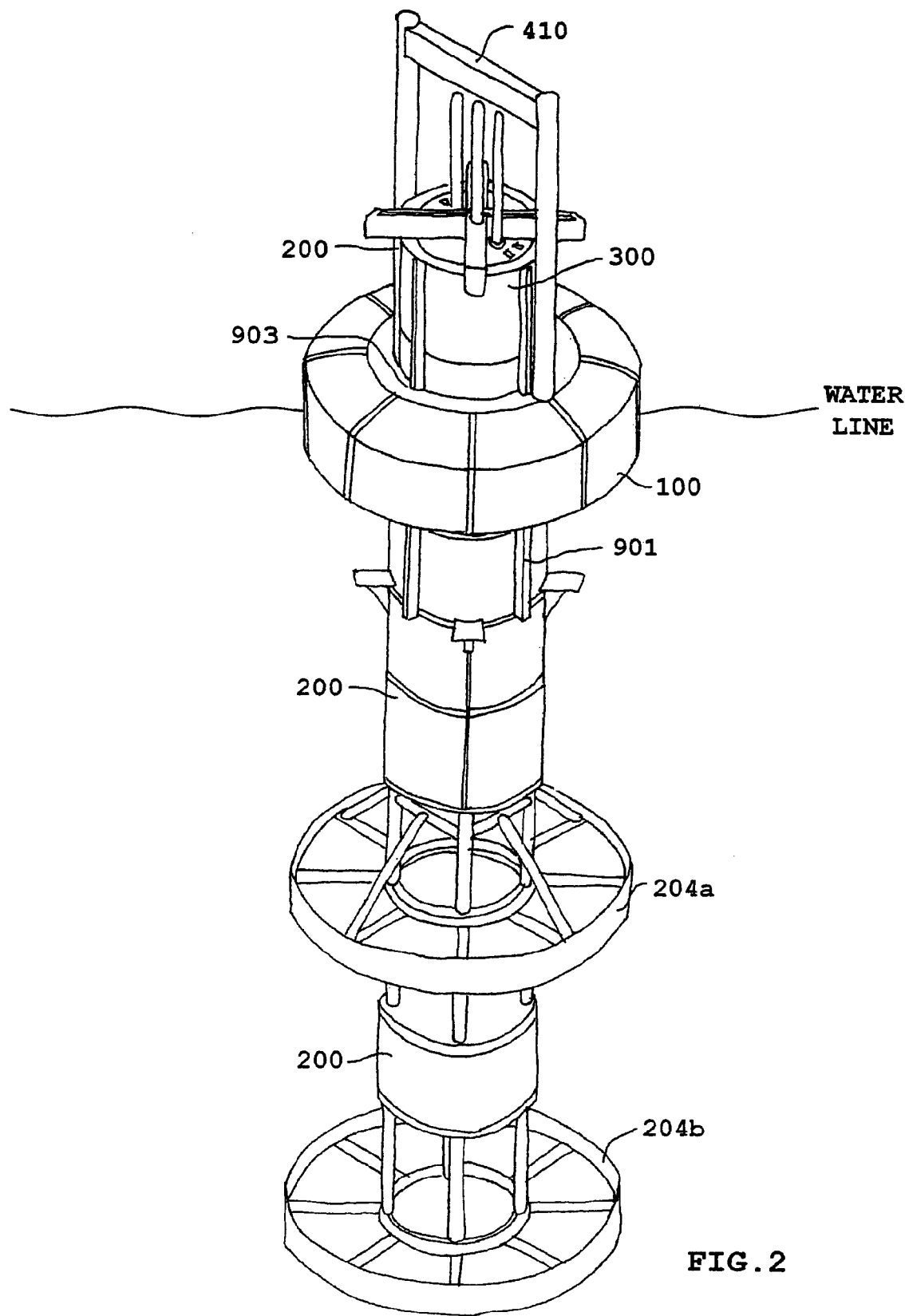
FIGS. 2 and 3 are isometric views of WECs embodying the invention showing the spar and float in greater detail and different connections of the heave plates to the spar.
Figure 3:
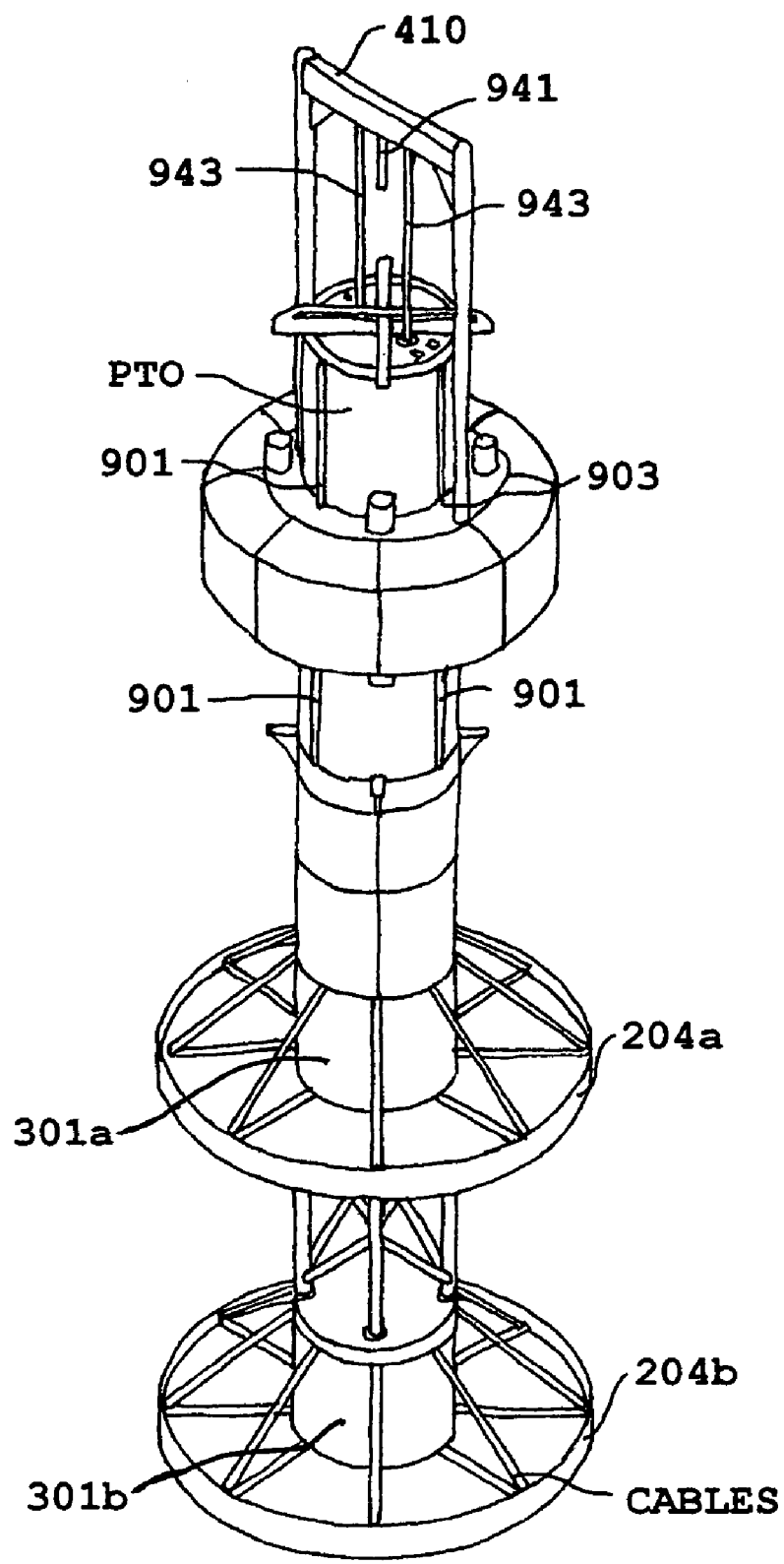

In FIGS. 2 and 3, there is shown a heave plate 204a mounted on and attached to the mid region of the spar and a heave plate 204b mounted on and attached to the lower or bottom portion of the spar. In both FIGS. 2 and 3, lips extend vertically above and below the surfaces of the heave plates. These figures also illustrate that the heave plates may be connected by rods descending from the spar or by cables and rods extending from the outer periphery of the heave plate to the spar to maintain the plate stable and generally perpendicular to the spar. Other structural configurations can be used for securing a heave plate and for stabilizing the float and spar.

Figure 4:
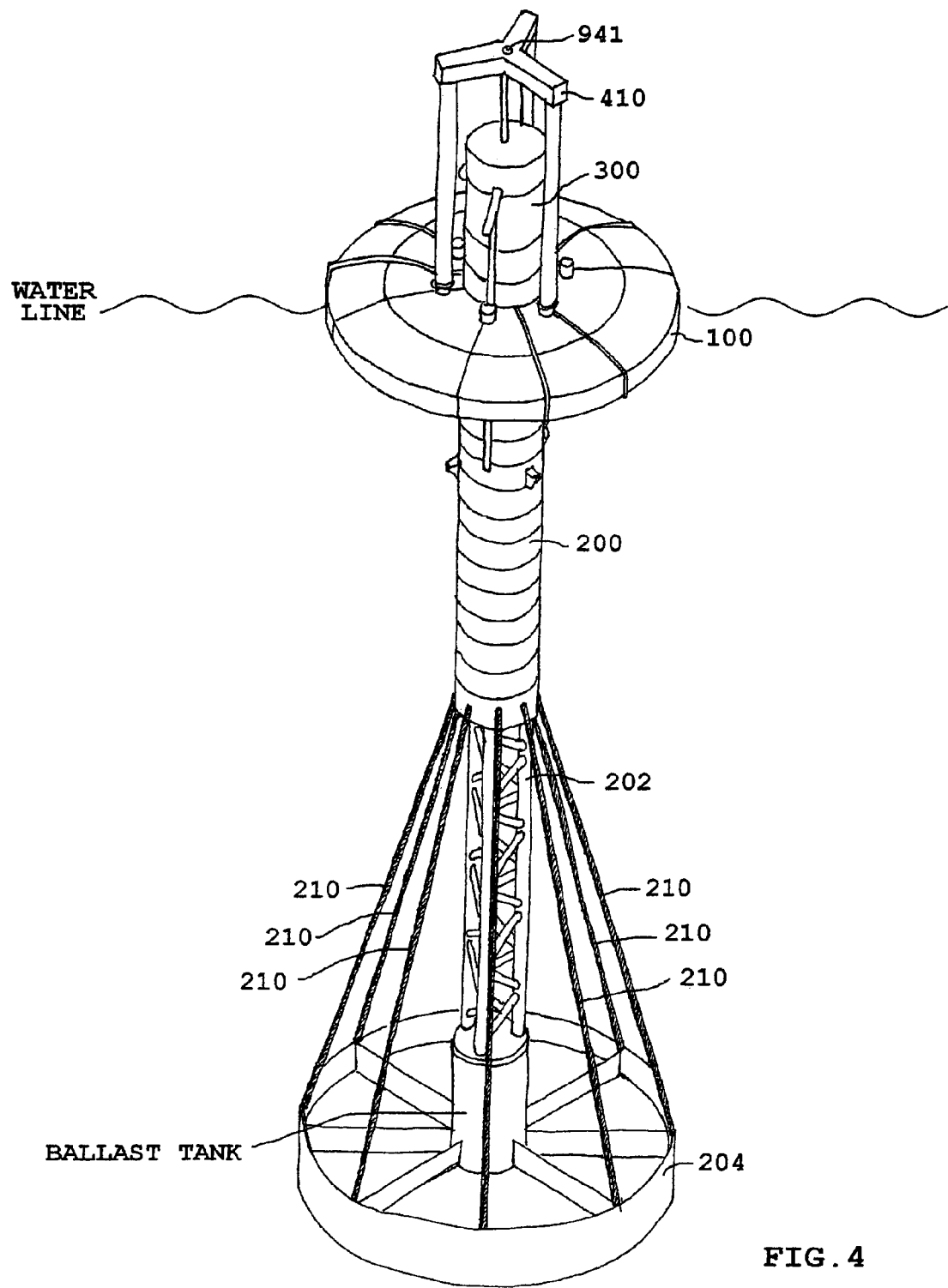
FIG. 4 is an isometric view of a WEC with a single heave plate, with raised edges (lips), connected to the spar.

FIG. 4 shows a spar 200 including a downwardly extending truss structure 202 with a single heave plate 204 mounted on the bottom end of the truss structure 202. The heave plate 204 includes an upper lip 206a and a lower lip 206b (as shown more explicitly in FIGS. 5 and 6. The heave plate and lip combination functions like a can or bucket containing the volume of a column of water being urged up or down. This can further increase the effective mass of the heave plate. In FIG. 4, the outer edge of the circular heave plate is shown connected by cables (or rods) 210 to the lower portion of the spar, above the truss 202. The truss 202 is shown to be an open truss section to reduce the effects of horizontal currents pushing against the spar and reduce weight.

FIG. 5 illustrates that the WEC 10 includes a heave plate 204 which is formed with an upper lip 206a and a lower lip 206b as discussed above. In FIG. 5 a PTO 300 is shown connected between the spar 200 and the float 100 to convert their relative motion to electrical (or useful) energy. This is intended to show that the PTO need not be within the spar. The PTO could be contained or mounted at any convenient point where it can be coupled to components driven by the spar and float to respond to their relative motion.

FIG. 6 illustrates a WEC system where the electric power from/to the PTO 300 of the WEC is made via a cable 361 to a connector 302 which is shown mounted above the water line to the top portion of the spar. A cable/conduit 304 is connected to connector 302 to couple the output of the PTO to points external to the WEC. Providing a power connection above the water line eliminates the need to have an underwater connection between the WEC's electrical system and devices external to the WEC. This results in an improved WEC with power extracted from the top portion of the buoy (above the water line) and avoids the need to make an underwater connection.

The use of a submerged heave plate on a WEC presents a challenge to/in the structural design. The shape of the heave plate form is essentially a large radius cantilevered platter (if the spar is centrally located), with a very large mass spread over its entire area, resulting in a very large moment at the attachment point to the spar and which will translate through the lower spar up to the upper spar.

Figure 7:
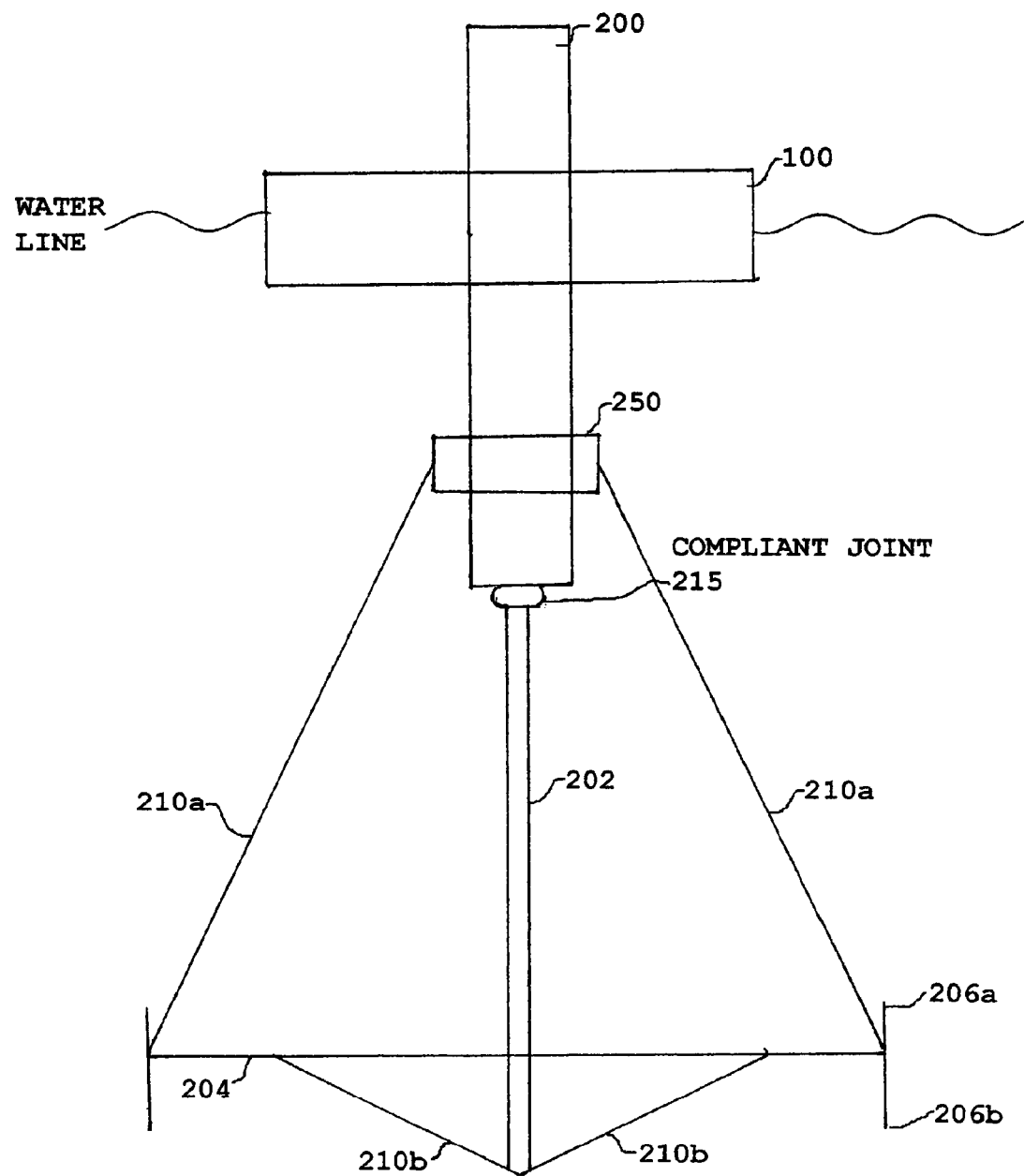
FIGS. 7 and 8 are cross-sectional diagrams showing a heave plate embodying the invention and cables connecting the heave plate to the upper portion of a spar, below the float.
Figure 8:
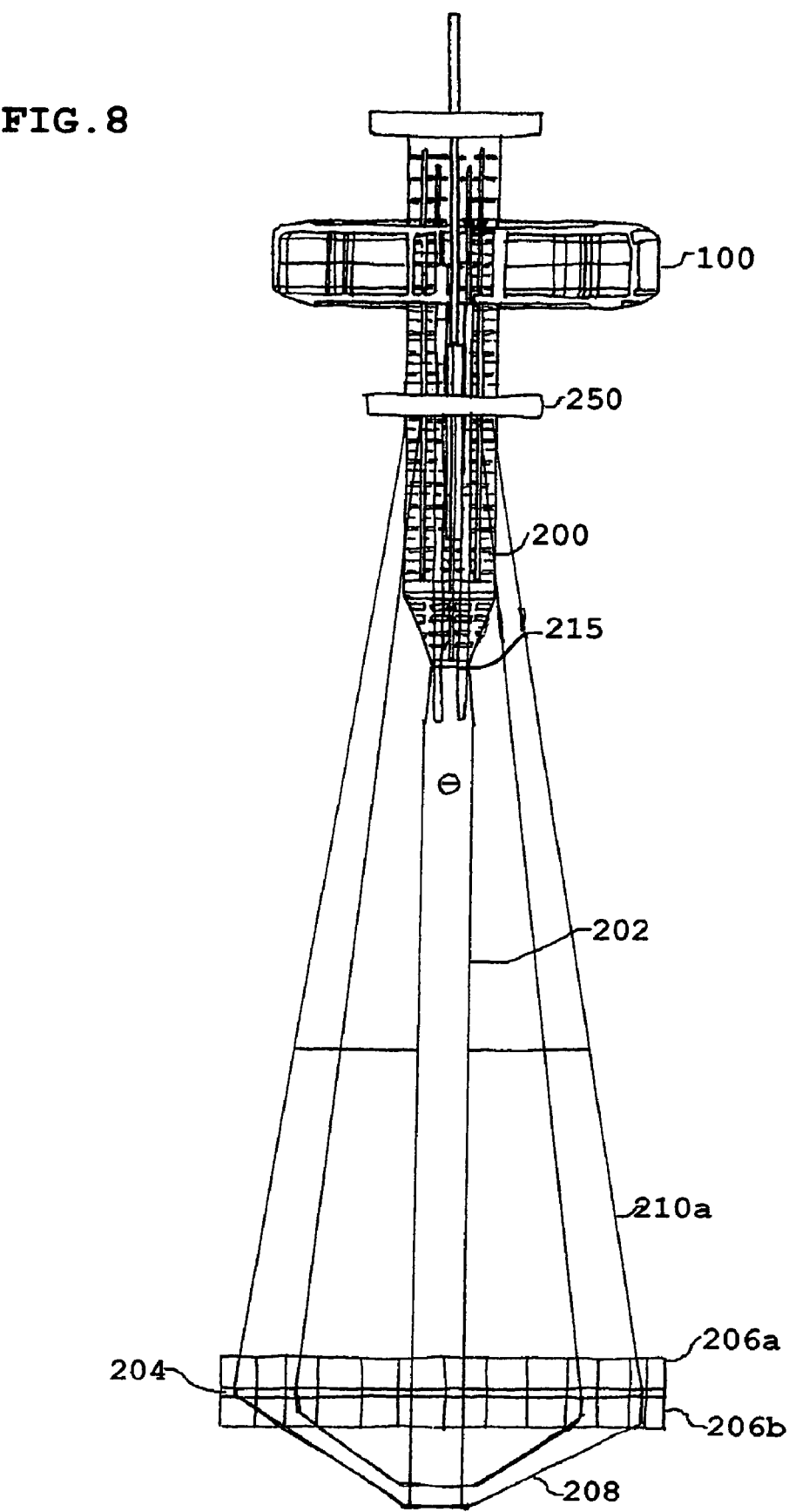

FIGS. 7 and 8 show a collar 250 connected to a lower region of the spar (the location of the collar may at any point below the water line) with cable/rods 210 extending to the periphery of the heave plate to secure and stabilize the plate. A spar extension strut 202 extends below the heave plate with cables/rods 210b connected between the lower end of the strut and the underside of the heave plate to also secure and stabilize the plate. FIG. 7 illustrates that the lower part of the spar 200 is connected to the upper part of the strut 202 via a compliant/flexible joint 215 to reduce the stress at that point.

A series of rods, cables, beams, or pipes shown in FIG. 8 can be used to support the heave plate in a triangulated configuration to counteract the large force and moment in either direction, up or down. The rods, cables, beams or pipes can be attached to the heave plate at the most structurally effective (lateral) distance from the lower spar attachment point. This point may at an inner point other than the outer edge of the heave plate.

FIG. 8 illustrates that tensioned cables, or rods, 210 may extend from the collar 250 attached to the spar, above a compliant/flexible joint 215, to the top surface of the heave plate. Another structure 208 below the heave plate supports the heave plate and counteracts tension from the tensioned element 210a. The flexible or compliant joint 215 will absorb any forces without producing a bending moment at the connection point between the upper portion of the spar, 200, and the extension strut 202. The tensioned cable design with the lower supporting struts places the extension strut 202 in compression. Structural members 208 underneath the heave plate are attached to the bottom of the spar below the heave plate and to the optimal location on the heave plate; these members supply a counter tension to members 210. This results in a cost effective structure that can support the movement of the added mass in the vertical direction.

Using a heave plate on a WEC (attaching a heave plate to a spar as shown and taught herein) results in increased power conversion efficiency for the WEC. For a model WEC with a centrally oriented cylindrical spar of, for example, a diameter of 1.75 m and draft of 25 m the heave natural resonance period of the spar is 10.5 sec. Hence, if an 11 sec wave is run past the spar that does not have a heave plate or a heave plate with "lips", the spar will respond to this wave practically in phase with the wave. Hence if a float were attached to the plain spar, then both objects would be moving practically in phase with the wave and in phase with each other, hence producing little to no relative motion and hence little to no power.

In sharp contrast, if a flat, circular heave plate of diameter 10 m is added to the spar, a heave natural resonance period of 31.7 sec is achieved. In addition, if vertical lip's are then added above and below the heave plate, each of height 0.8 m, then the heave natural resonance period is further increased to 34.7 sec. The larger the heave natural resonance period, the longer it will take for the object (spar, spar with heave plate, spar with heave plate with lips) to respond to the wave (hence the greater the phase lag between the object and the wave). Thus, if a float, that is designed to move practically in phase with the waves, is attached to a spar with a large heave natural resonance period the relative motion between the two can be dramatically increased. This results in a significant increase in power production by the PTO.

The use of heave plates with other floating objects, particularly oil platforms, is now discussed.

The addition of vertical structures (lips) to the heave plate used in WECs to control the up down movement of the spar provides the advantages discussed above. Applicants recognized that forming a heave plate with lips is also applicable for applications where the heave plate is attached to the submerged portion of a spar which is fixedly attached to a platform, where the heave plates are used to increase the mass of the spar and ensure that the spar and the platform to which it is attached have limited up down motion.

Figure 1A:
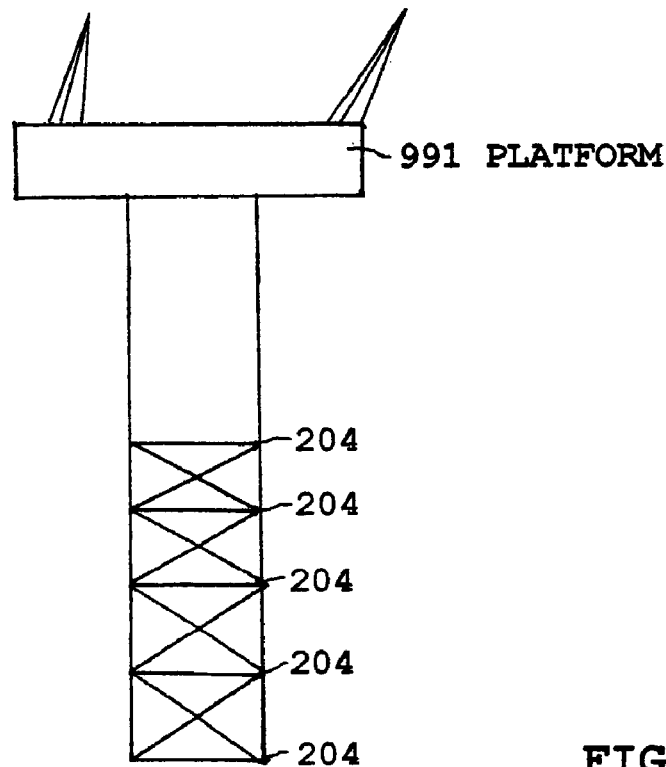
FIGS. 1A and 1B are highly simplified prior art diagrams of spar-like structures (e.g., a truss spar and cell spar) for stabilizing oil platforms.
Figure 1B:
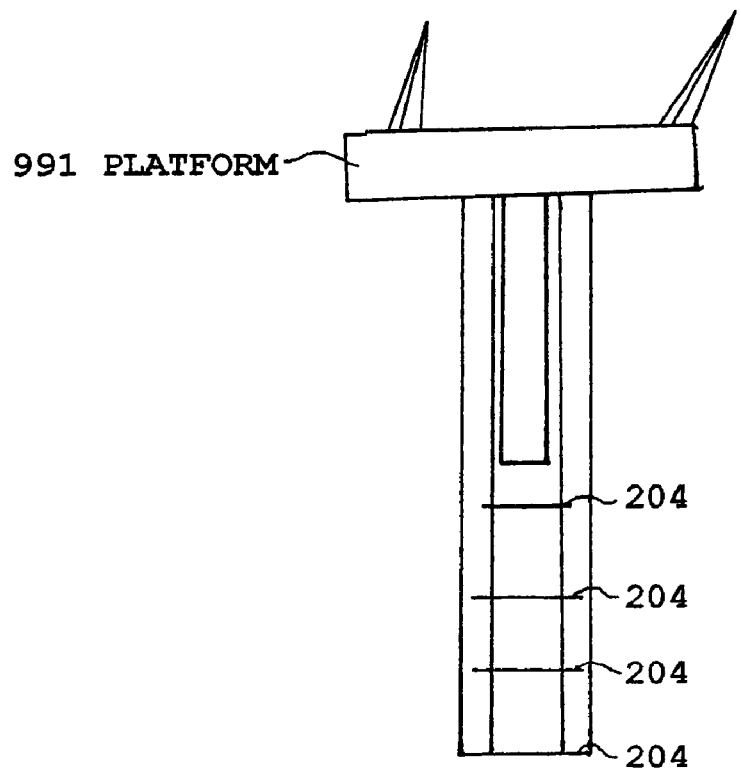

As noted above, FIG. 1A is a simplified diagram of an oil platform above the surface of the water which is supported by a single large diameter vertical cylinder with strakes. The mooring for the system attaches to this cylinder. Below the cylinder is an open truss system with multiple heave plates spanning the distance between the structural truss. FIG. 1B is a simplified diagram of an oil platform above the surface of the water which is supported by multiple small diameter circular cylinders. These cylinders (typically there are six) alternate between the entire length of the structure and a shorter length. When combined, these multiple cylinders give the impression of an equivalent single shorter large diameter cylinder below the platform and an open structure below inside of which the heave plates are nestled. The mooring is attached in the region where the shorter cylinders are present and strakes also wrap around this region.

Figure 9:
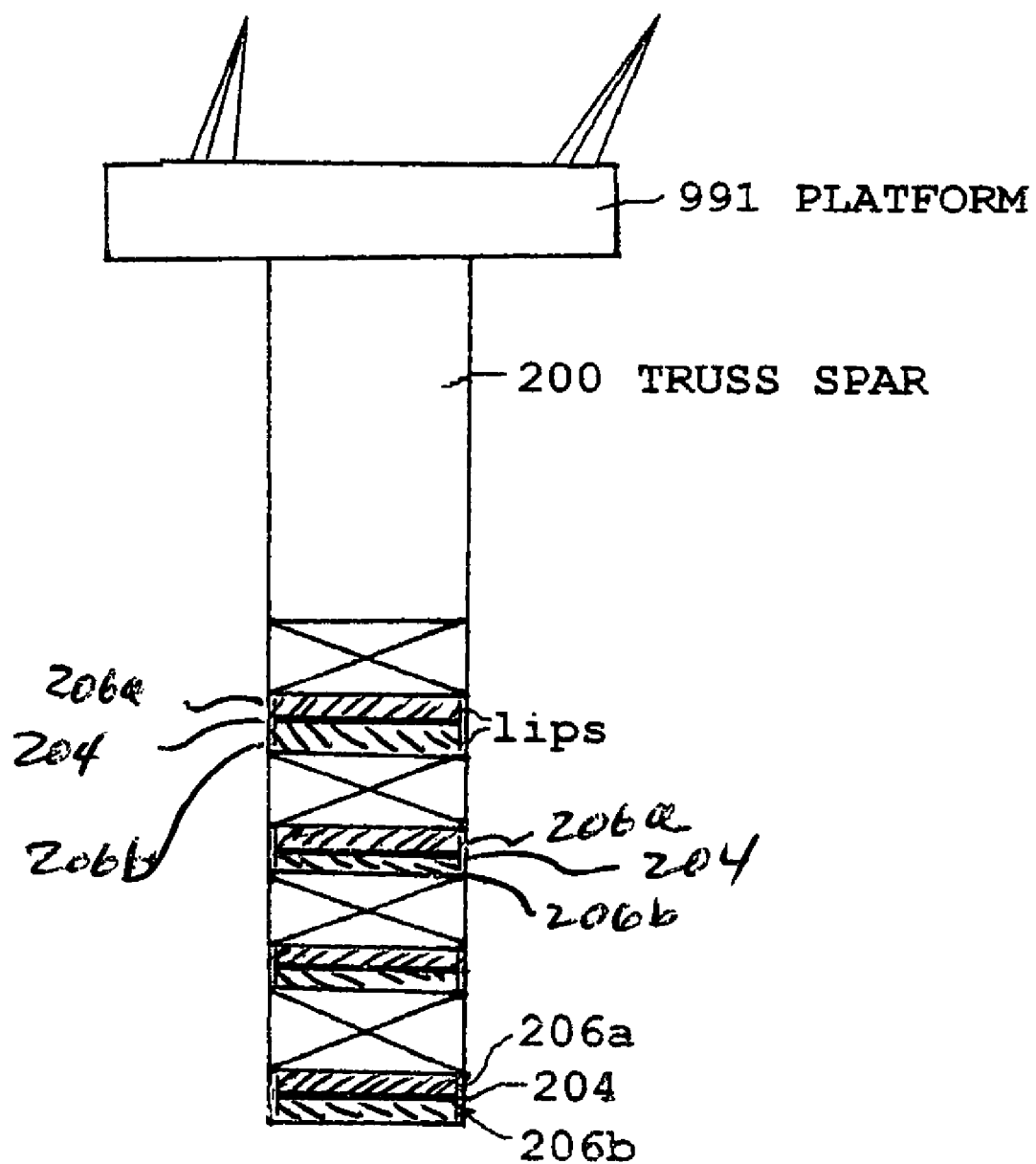
FIG. 9 is a simplified diagram of a truss spar oil platform having heave plates with lips, in accordance with the invention.
Figure 10:
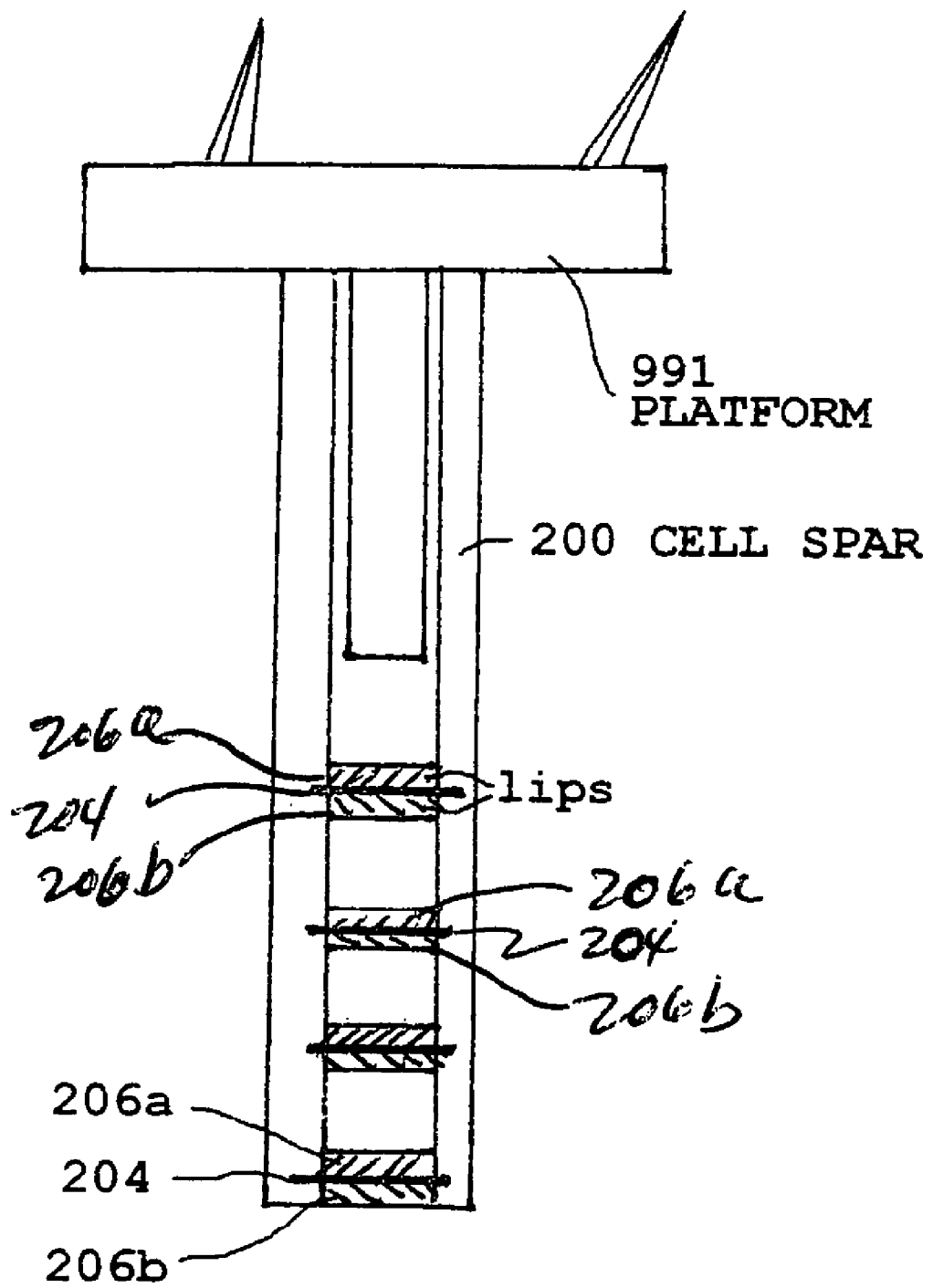
FIG. 10 is a simplified diagram of a cell spar oil platform having heave plates with lips, in accordance with the invention.

The stability of the platforms is improved by the addition of lips to the heave plates as shown in FIGS. 9 and 10. FIGS. 9 and 10 illustrate the addition of vertical structures 206a, 206b to the heave plates 204 shown for the truss spar oil platform and cell spar oil platform in FIGS. 9 and 10, respectively. As already discussed, the addition of perpendicular vertical structures (lips 206a, 206b) to the heave plate results in added mass of [(Experimental Factor)*(Equivalent Volume of Plate)+(Vertical Height)*(Area of Plate)]*$\rho$. The additional added mass achieved by the vertical structures is a function of the [(Vertical Height)*(Area of Plate)]*$\rho$. It is understood that for the structures of FIGS. 9 and 10 a number of spar like elements may be constructed between the underside of the platform and the heave plate 204 with lips being formed along the top and bottom surfaces of the heave plate.

Figure 12:
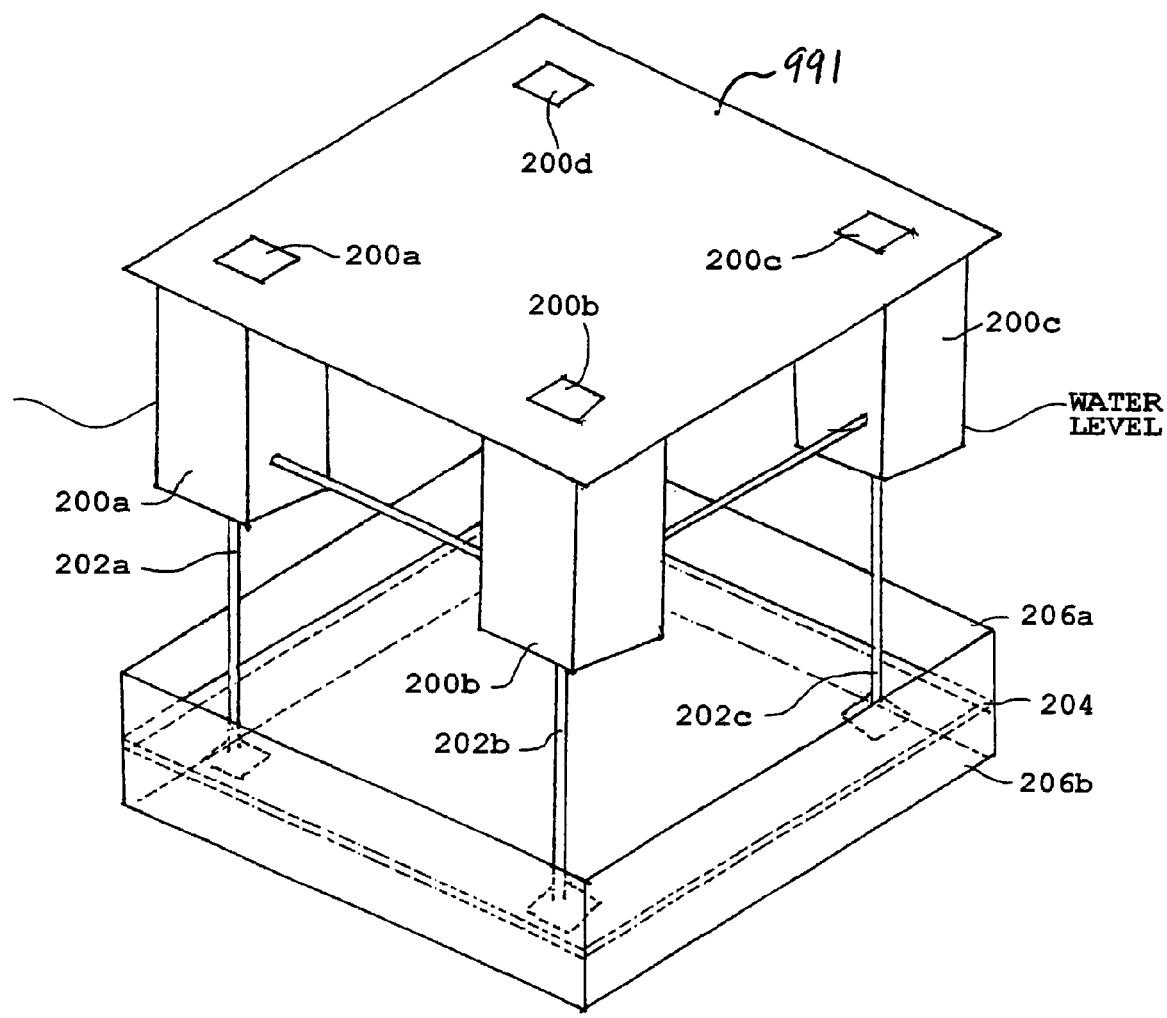
FIG. 12 is a simplified diagram of an offshore platform to which is attached a heave plate with vertical structures (lips).

In FIG. 12 an offshore platform 991 is mounted atop spars (columns), 200a, 200b, 200c, 200d. The columns extend via extension struts (which may be cylindrical columns or truss like structures), 202a, 202b, 202c, (and 202d, not shown) to heave plate 204. The extension struts are suitably attached to the heave plate and the spars (columns) from which they extend. FIG. 12 shows lips 206a, 206b (vertical structures) generally perpendicular to the heave plate extending around the periphery of the heave plate. In this embodiment the spars are symmetrically (rather than centrally) disposed relative to the heave plate and the platform.

Figure 11:
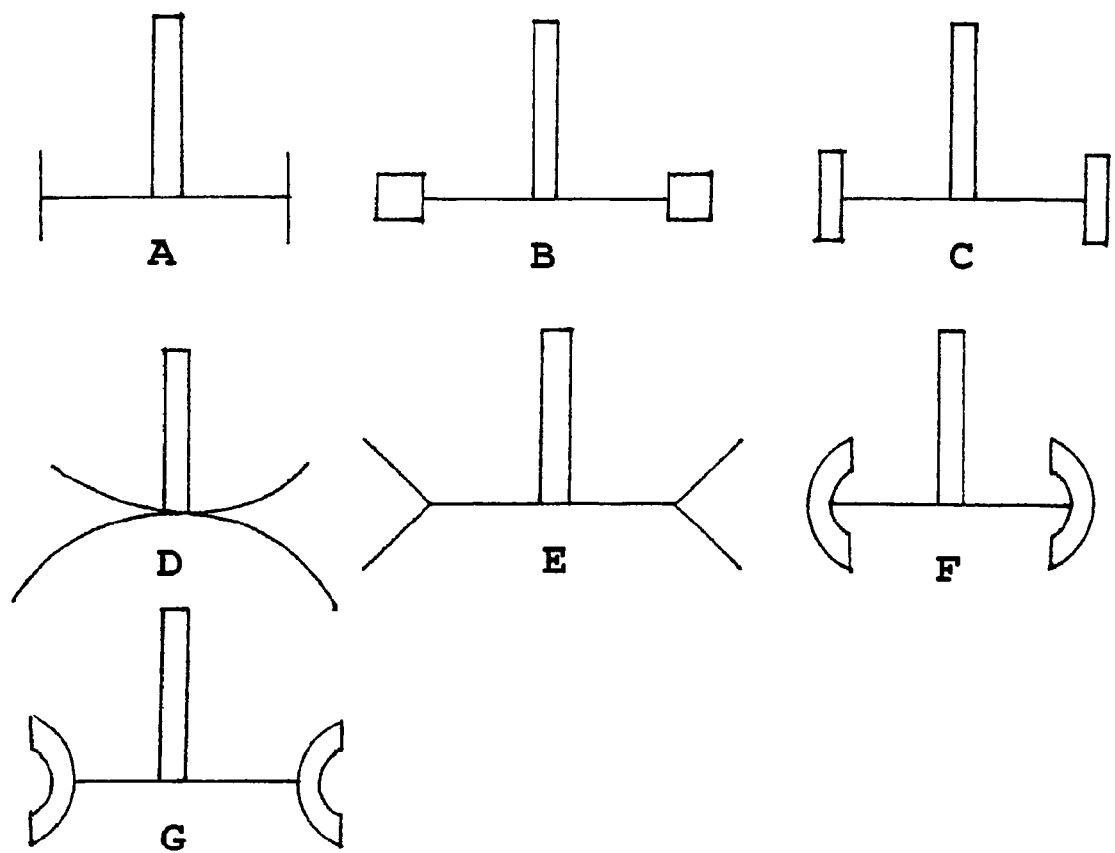
FIGS. 11 A-G are simplified diagrams of possible "lip" structures for use in practicing the invention.

The lips can have different shapes as shown in FIGS. 11A-11G, as discussed below:

Referring to FIG. 11A, the addition of perpendicular vertical plates to the heave plate will result in added mass of [(Experimental Factor)*(Equivalent Volume of Plate)+(Vertical Height)*(Area of Plate)]*$\rho$. The additional added mass achieved by the vertical members is the [(Vertical Height)*(Area of Plate)]*$\rho$.

Referring to FIG. 11B, the addition of a square tube around the plate geometry results in added mass of [(Experimental Factor)*(Equivalent Volume of Plate, including the extra length of the square tube)+(Length of Square)*(Area of Plate)]*$\rho$. The additional added mass achieved by the vertical members is the [(Length of Square)*(Area of Plate)]*$\rho$.

Referring to FIG. 11C, the addition of a rectangular cuboid (a 3-dimensional object surrounding the plate geometry with a rectangular cross-section) results in a larger addition to the added mass of the plate by the "vertical member" than the geometry shown in Figure B if the longer side is oriented in the vertical direction.

Referring to the configuration shown in FIG. 11D, here, as opposed to attaching vertical members, the shape of the heave plate itself is altered so that a non-symmetric response to the wave climate is achieved as well as increasing the heave added mass over a plain straight plate.

Referring to FIG. 11E, the addition of members with both a vertical and horizontal component results in added mass of [(Experimental Factor)*(Equivalent Volume of Plate, including the horizontal component of the diagonal members)+ (Vertical Height of diagonal members)*(Area of Plate)]*ρ. The additional added mass achieved by the vertical members is the [(Vertical Height of diagonal members)*(Area of Plate)]*ρ.

Referring to FIGS. 11F & 11G, The addition of thick or thin partial circular members with a vertical dimension curving towards the spar or away from the spar increases the added mass as stated in previous descriptions by the vertical dimension.

It should be appreciated that, as shown herein, the invention includes a damping plate attached to the submerged end of a spar-like element floating in a liquid. This makes the invention also applicable in industrial mixing applications. The spar like element may be driven up and down by an externally applied force. The damping plate has a pair of oppositely facing surfaces extending transversely to the vertical direction of the movement of the spar-like element and the vertical structures are mounted on the oppositely facing surfaces for increasing the effective mass of liquid pushed during movement of the damping plate through the liquid.

What is claimed is:

1. A wave energy converter (WEC) comprising: a float intended to lie along the surface of a body of water and designed to move in-phase with the waves present in the body of water; a spar intended to extend vertically, generally perpendicular to the float and the surface of the body of water, said spar extending below the surface of the body of water and intended to move vertically up and down out-of-phase with the waves; a power take off device (PTO), connected between the spar and the float, responsive to their relative motion to convert the relative motion to useful energy; and a heave plate symmetrically connected to a submerged portion of the spar, said heave plate extending in a plane perpendicular to the spar, said heave plate having a pair of oppositely facing surfaces extending transversely to the vertical direction of the movement of the spar element and vertical structures mounted on the oppositely facing surfaces; said vertical structures defining an enclosure whose sides are solid and of predetermined height for capturing a volume of water equal to the enclosed surface area of the damping plate multiplied by the height of the vertical structures and configured to push a volume of water in a direction parallel to and opposing the movement of the spar for thereby increasing the effective mass of water pushed in the up and down vertical direction during movement of the damping plate through the water.

2. A WEC as claimed in claim 1 wherein the length/height of the vertical structure above the heave plate has a first dimension, and wherein the length/height of the vertical structure below the heave plate has a second dimension.

3. A WEC as claimed in claim 2, wherein the length/height of the vertical structure above the heave plate has the same dimension as the length/height of the vertical structure below the heave plate.

4. A WEC as claimed in claim 1, wherein the vertical structure is connected to the outer periphery of the damping plate.

* * * * *